United States Patent
Sevic et al.

(10) Patent No.: US 11,228,342 B2
(45) Date of Patent: Jan. 18, 2022

(54) HIGH BANDWIDTH SCALABLE WIRELESS NEAR-FIELD INTERFACE

(71) Applicants: John F. Sevic, Los Gatos, CA (US); Romain Pelard, Redwood City, CA (US); Joy Laskar, Los Altos, CA (US)

(72) Inventors: John F. Sevic, Los Gatos, CA (US); Romain Pelard, Redwood City, CA (US); Joy Laskar, Los Altos, CA (US)

(*) Notice: Subject to any disclaimer, the term of this patent is extended or adjusted under 35 U.S.C. 154(b) by 0 days.

(21) Appl. No.: 16/424,295

(22) Filed: May 28, 2019

(65) Prior Publication Data

US 2020/0076471 A1  Mar. 5, 2020

Related U.S. Application Data (63) Continuation-in-part of application No. 16/208,906, filed on Dec. 4, 2018, now abandoned, which is a continuation-in-part of application No. 16/026,568, filed on Jul. 3, 2018, now abandoned, which is a continuation-in-part of application No. 15/830,731, filed on Dec. 4, 2017, now abandoned.

(51) Int. Cl.
| | |
|---|---|
| H04B 5/00 | (2006.01) |
| H01Q 1/52 | (2006.01) |
| H01Q 21/06 | (2006.01) |
| H01Q 21/00 | (2006.01) |
| H01Q 11/08 | (2006.01) |

(52) U.S. Cl.
CPC ............ *H04B 5/0031* (2013.01); *H01Q 1/523* (2013.01); *H01Q 11/08* (2013.01); *H01Q 21/0087* (2013.01); *H01Q 21/06* (2013.01)

(58) Field of Classification Search
CPC ......... H01Q 1/523; H01Q 21/06; H01Q 21/28
See application file for complete search history.

(56) References Cited

U.S. PATENT DOCUMENTS

| | | | |
|---|---|---|---|
| 9,614,590 B2 | 4/2017 | McCormack et al. | |
| 2008/0159363 A1* | 7/2008 | Rofougaran | H01Q 23/00 375/219 |
| 2008/0288195 A1* | 11/2008 | He | G01R 31/31703 702/65 |
| 2011/0156963 A1* | 6/2011 | Rajgopal | H01P 1/203 343/702 |
| 2011/0227795 A1* | 9/2011 | Lopez | H01Q 1/243 343/700 MS |
| 2016/0308563 A1* | 10/2016 | Ouyang | H04B 1/04 |
| 2017/0104263 A1* | 4/2017 | Hosseini | H01Q 21/08 |

* cited by examiner

*Primary Examiner* — Devan A Sandiford
(74) *Attorney, Agent, or Firm* — Useful Arts IP (57) ABSTRACT

A transmitter or transceiver assembly includes at least one transmitter module. The transmitter module includes a matrix of transmitter integrated circuit die and a matrix of antennas, each antenna being coupled to a respective transmitter integrated circuit die. The matrix of antennas is configured to reduce interaction between signals transmitted by respective ones of the antennas.

13 Claims, 7 Drawing Sheets

HIGH BANDWIDTH SCALABLE WIRELESS NEAR-FIELD INTERFACE

BACKGROUND

Many electronic devices use interaction of electromagnetic phenomena to communicate information. In such devices, it may be desirable for close proximity scalable data communication using predominantly radiative electromagnetic interaction, frequently by means of antennae. It is further desirable that such electromagnetic interaction be substantially immune to the environment in which it is operating.

A number of interacting electromagnetic phenomena may be exploited for proximity data communication, for example for electromagnetic radiation. Such electronic devices are subject both to environmental constraints and physical laws governing radiation and scattering at wavelengths similar to dominant environmental dimensions. Simultaneous coexistence of demanding environmental constraints and near-field effects can substantially impair data transmission quality. An improved means of scalable electromagnetic interaction is therefore desired.

Signal conditioning and processing may be applied in an electromagnetically interacting communication link to optimize channel performance. For example, frequency shifting may be applied in a radiatively interacting communication link. As a form of diversity, such heterodyne or homodyne frequency shifting provides for substantial improvement in terms of channel performance, among other factors.

BRIEF DESCRIPTION OF THE DRAWING FIGURES

The present invention may be further understood from the following description in conjunction with the appended drawing figures. In the drawing.

DESCRIPTION

Summary

The present invention describes a high-speed wireless data transmission link composed of a plurality of radiating elements operating as multiple free-space electromagnetically coupled links. The links may be aggregated to appear as a single homogeneous data link, for example at terabit data rates, or may operate as multiple independent links.

To fully benefit from scale advantages offered by radiative coupling, various phenomena may be exploited to minimize deviation from ideal. In addition, various signal conditioning and processing techniques may be applied to enhance, or improve, channel capacity, reliability, and performance.

Various phenomena, such as polarization, frequency diversity, spatial separation, etc., are simultaneously used to enable dense packing of a matrix of individual radio cells isolated by various forms of diversity. These individual radio links are arrayed, or aggregated, to provide a scalable close proximity scalable wireless communication device, for example at terabit data rates.

Radiative near-field interaction with optimal signal conditioning and processing enable a close proximity scalable communication link, for example at terabit data rates. Spurious near-field interaction suppression is intrinsically obtained by exploiting 3-D radiation structures, for example the helical antenna, thereby enabling dense packing matrix of individual near-field communication links sharing a common substrate acting on aggregated data.

Transmission of large amounts of data by electromagnetic coupling in a constrained environ might be required to take place between two distinct objects in proximity. It is desired to maximize transmission between the TX and RX of each (possibly many) radiatively coupled channel without interfering with adjacent or nearby channels radiatively coupled.

Simultaneous optimal coupling and interference rejection can be implemented by optimal radiating element design, for example the helix antenna. In this manner, transmission energy can be focused or directed to the intended recipient while minimizing interference with adjacent or nearby channels.

Adjacent or nearby cells are added to improve aggregate link capacity, reliability, and efficiency, yielding an easily scaled group or matrix of diverse electromagnetically coupled transmission links acting as one homogeneous data link, for example at terabit data rates.

In one embodiment, a transmitter or transceiver assembly includes at least one transmitter module. The transmitter module includes a group of transmitter integrated circuit die and a group of antennas, each antenna being coupled to a respective transmitter integrated circuit die. The group of antennas is configured to reduce interaction between signals transmitted by respective ones of the antennas.

DETAILED DESCRIPTION

Figure 1:
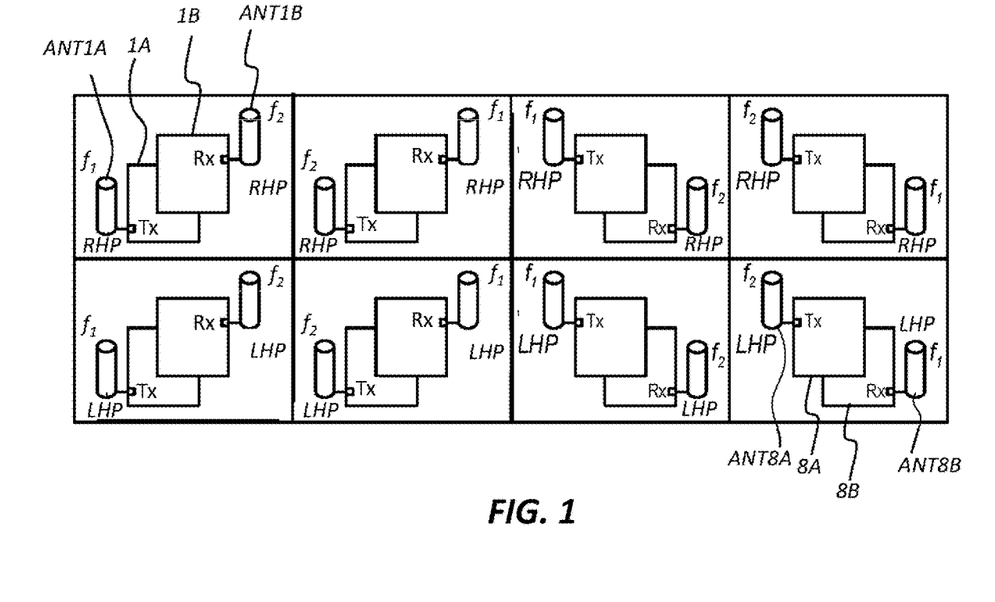
FIG. 1 shows one possible implementation of a matrix of individual electromagnetically coupled transmission links. Here the frequency-shifting is performed by a mmW CMOS IC.

Referring to FIG. 1, a schematic diagram is shown of a transceiver assembly in accordance with one embodiment.

In FIG. 1, cylinders represent circularly polarized radiating elements (e.g., antennas) transmitting on different frequency channels. In the illustrated embodiment, the frequency channels include a first frequency channel $f_1$ and a second frequency channel $f_2$. The use of multiple channels (frequency diversity) reduces interferences between transmissions of different antennas. The number of channels may be greater than two. However, the invention does not require such diversity to function. An example of a distinguishing feature between the two kinds of antennas is polarization. For example, a first subset of cylinders having a notation RHP may exhibit right-handed polarization and a second subset of cylinders having a notation LHP may exhibit left-handed polarization, or vice versa. The antennas may be designed to be highly directive, or exhibit an arbitrary radiation pattern.

Figure 4A:
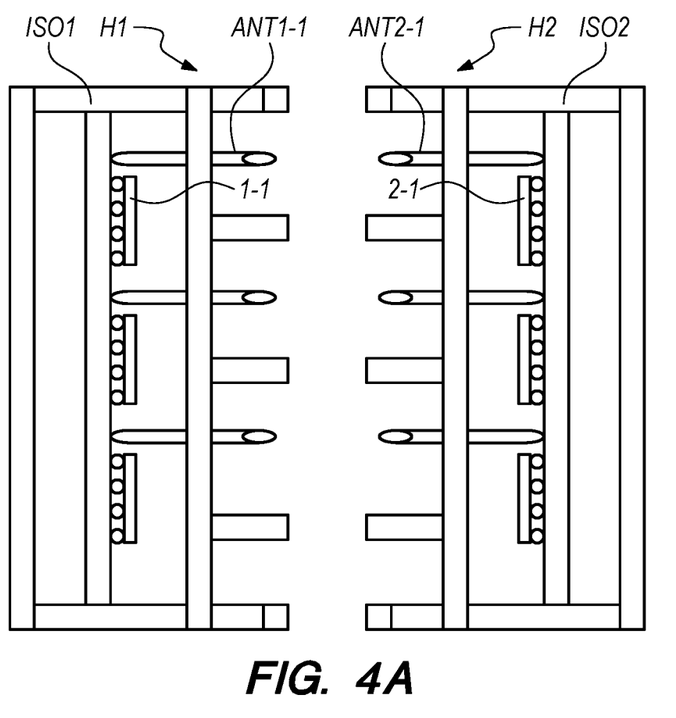
FIG. 4A is a diagram of mating interface modules.
Figure 4B:
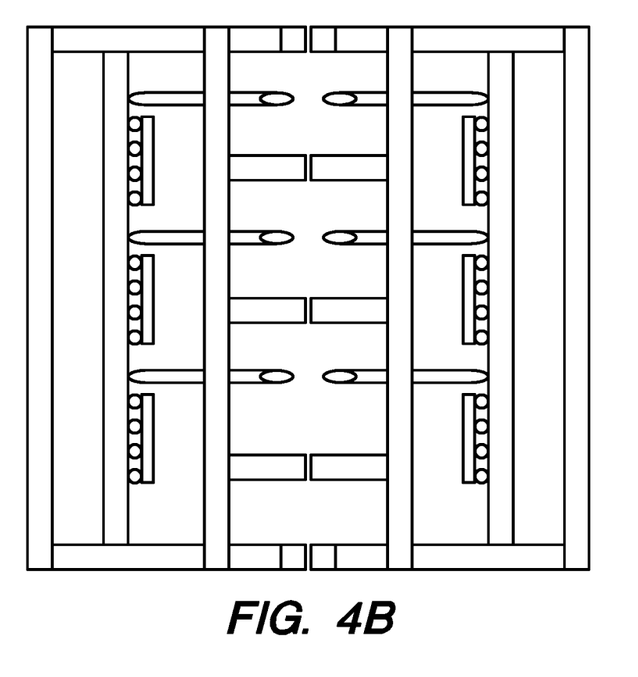
FIG. 4B is a diagram like that of FIG. 4A with the interface modules attached.

A "cell" is formed by coupling an antenna (e.g., ANT1A) to a transmit port of a transceiver (1A) and coupling an antenna (ANT1B) to a receive port of a paired transceiver (1B). The paired transceivers 1A and 1B may be realized in the form of stacked integrated circuits. As seen in FIGS. 4A and 4B, the transmit port of transceiver 1 and the receive port of transceiver 1 may form one side of a full duplex link. A link (or channel) is formed by coupling a transmitter and a receiver of H1 with a transmitter and a receiver of H2. In one direction of the link, the pairing transmitter and receiver are communicating with each other using the same frequency $f_1$ and using an antenna of same polarity (e.g., RHP or LHP). In the other direction of the link, the pairing transmitter and receiver are communicating with each other using the same frequency $f_2$ and using an antenna of same polarity (e.g., RHP or LHP), where links in different directions use different polarities. However, the invention does not require such isolation to function.

In general, $f_1$ may be different or equal to $f_2$. Moreover, the polarities of the links formed by a transceiver pair, represented generally as $P_1$ and $P_2$, may be the same or different. Other types of polarization than circular polarization may be used. The same generalization applies for all adjacent channels. The choice of frequency and polarization for each link and channel may be made according to the physical location of the link respective to each other (taking geometry of the elements into account) in order to optimize isolation and minimize interference at the system level.

Spatial diversity may be enhanced with respect to a transceiver pair by coupling a transmit antenna and a receive antenna such that they oppose each other diagonally, increasing the separation distance between the antennas.

Each transceiver chip is capable of being a transmitter or a receiver and can digitally set or adjust its frequency of operation. This feature of frequency programmability provides useful versatility to the resulting system. Each separate transceiver chip may be surrounded by an isolation structure (e.g., made of conductive material), forming a "cell," as described, for example, in U.S. Pat. No. 9,325,384, incorporated herein by reference. In other instances, the isolation structure may be made of other types of material having suitable radiation absorption characteristics.

Additional modules like that of FIG. 1 may be combined in a single system.

Cross polarization rejection (based on the use of different polarizations for different links) yields approximately −20 dBi additional isolation. The combination of spatial diversity, polarization diversity, frequency diversity (transmit and receive), spatial selectivity (due to antenna directivity and radiation characteristics) and the use of an isolation structure enables wireless connectivity in the range of multiple Gpbs to multiple Tbps to be achieved. However, the invention does not require all such features, or any specific one, in order to function.

Figure 2:
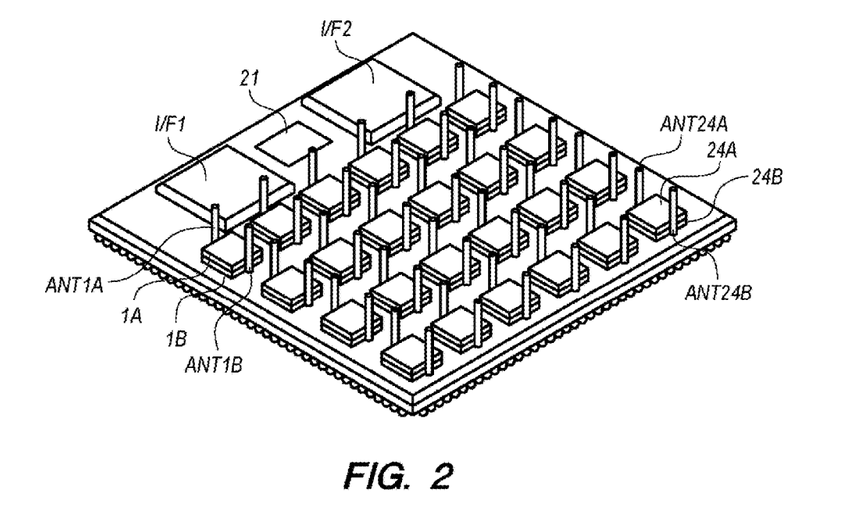
FIG. 2 shows a transceiver module like that of FIG. 1.

Referring to FIG. 2, a diagram is shown of one implementation of the transceiver assembly of FIG. 1, in the form of a multi-chip module (MCM) or system in package (SIP). In an exemplary embodiment, radio transceiver chips (e.g., 1A, 1B through 24A, 24B, which may be of a type commercially available from Maja Systems of Milpitas, Calif., USA) are paired. In one strictly exemplary embodiment, the transceiver chips are stacked in pairs of two, with the bottom unit being flip-chipped or wire-bonded and the top unit being wire-bonded. Antennas (e.g., ANT1A through ANT24B) may be mounted to the MCM substrate in pairs, corresponding to the pairs of transceiver chips. The bottom transceiver chip may be coupled to one of the antennas through the MCM substrate. The top transceiver chip may be coupled to the other antenna by wire bonding. One or more interface chips (IF/1, IF2) receive and transmit data between the transceiver chips and the system. In some embodiments, compactness is furthered by locating the transceiver chip within one or more cavities formed in a back side of the MCM substrate. A controller chip 21 is provided.

Figure 3A:
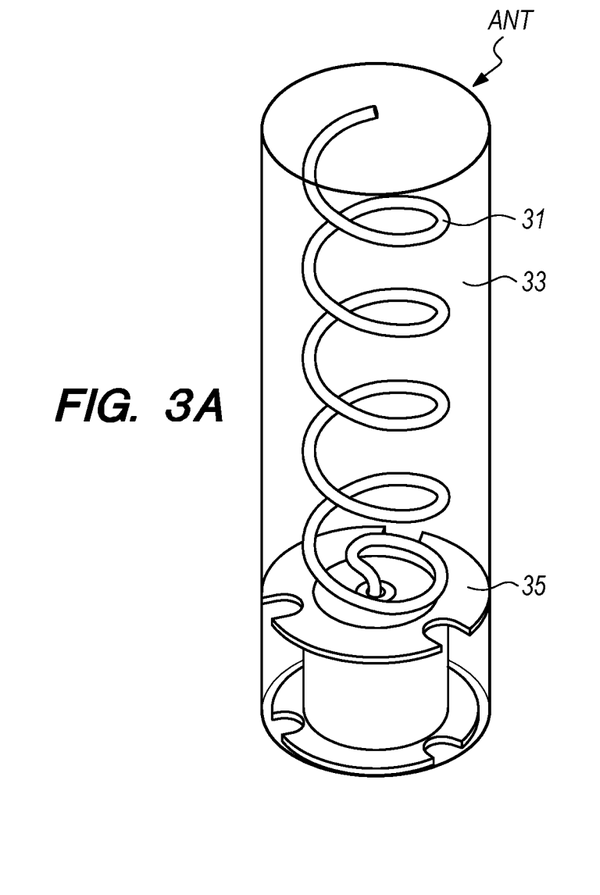
FIG. 3A is a diagram of an antenna suitable for use in the transceiver assembly of FIG. 1.
Figure 3B:
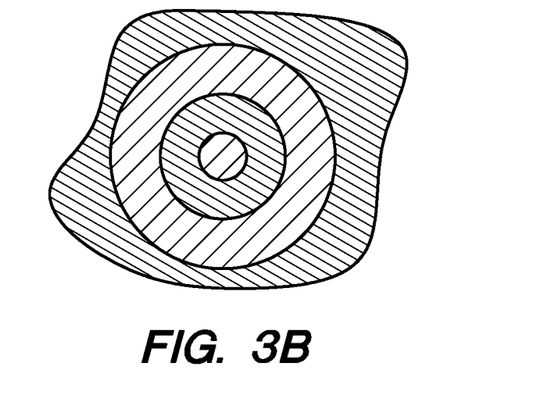
FIG. 3B is a diagram of a portion of a printed circuit board for surface mounting of the antenna of FIG. 3A.

Details of one suitable antenna ANT are shown in FIG. 3A-3B. The antenna may be a surface mount antenna. In one embodiment, the antenna includes a wire helix 31 and a cylindrical base member 35. An interior of the base member may include a cylindrical center contact to which an end of the wire helix is joined, surrounded by an insulating material. The wire helix, in one embodiment, may have an inner diameter of approximately 1.6 mm. Using 34 AWG wire, the wire may have approximately 4 turns spaced at a pitch of 1.5 mm. The entire assembly may be encased in potting compound 33 and may have dimensions of approximately 9.5 mm by 4 mm. The word "approximately" is used herein to mean +/−100%.

The bottom flange of the base member and its associated center contact may be metal-coated (e.g., tin-coated) for purposes of surface mounting to a PCB area like that of FIG. 3B.

Figure 6:
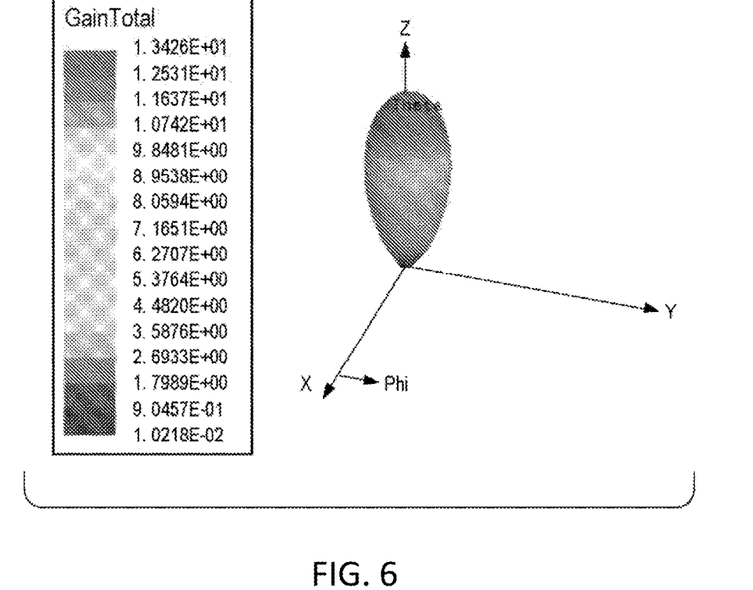
FIG. 6A is a diagram illustrating a radiation pattern of the antenna of FIG. 3A in accordance with one embodiment.
FIG. 6B is another a diagram illustrating the radiation pattern of the antenna of FIG. 3A in accordance with one embodiment.
Figure 7:
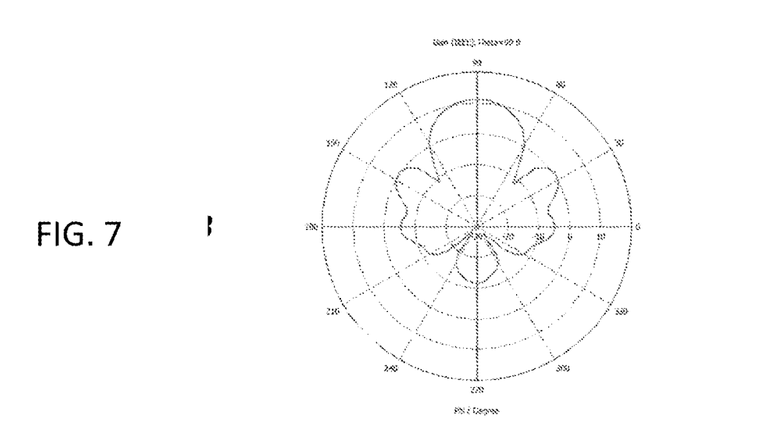
FIG. 7 is a diagram illustrating a radiation pattern of the antenna of FIGS. 6A-6B.

A representation of the radiation pattern of the antenna is shown in FIG. 6A (three-dimensional representation) and FIG. 6B (polar representation).

In one embodiment, antennas like those of FIG. 3A are provided on tape and reel. In another embodiment, antennas like those of FIG. 3A are provided in a tray. A printed circuit board may be populated with a large group of such antenna using automated pick-and-place techniques.

The antenna of FIG. 3A has characteristics that are especially advantageous in a large group of such antennas (e.g., tens or hundreds of antennas). First, the antenna is highly directive in the Z axis as shown, minimizing interference between antennas. Directivity may be increased by increasing the number of turns of the helix. Second, in contrast to more common planar antennas, the antenna enables a compact footprint, using vertical space instead of highly constrained horizontal area.

Referring to FIG. 4A, a cross-sectional view is shown of two halves (H1, H2) of an interface module. Each half of the interface module may be constructed in a similar manner as described in relation to FIG. 1. When the two halves are joined (FIG. 4B), cells are formed in each cell of which opposing antennas (e.g., ANT1-1 and ANT2-1) are surrounded by an isolation structure (ISO1, ISO2) that prevents or reduces interference from transmissions of other cells. In one embodiment, a layer of RF absorbing paste is applied to a populated printed circuit board and then patterned (e.g., exposed and etched) to form isolation structures as shown. Note that in this embodiment, transceiver chips 1-1 and 2-1 are situated on the same side of respective circuit board from antennas ANT1-1 and ANT2-1.

Alignment of the isolation structures of the two halves results in a desired alignment of antennas and a desired spacing apart of antennas in the Z direction. In general, the two halves will be provided as part of devices, the devices having housings. The device housings may be provided with docking features to bring the devices into a desired condition of spacing and alignment. In this condition, the isolation structures will also be aligned in a desired alignment.

Alternatively, an isolation structure like that of FIG. 1 may be used in which both transceiver chips and antennas are isolated from one another.

Figure 5A:
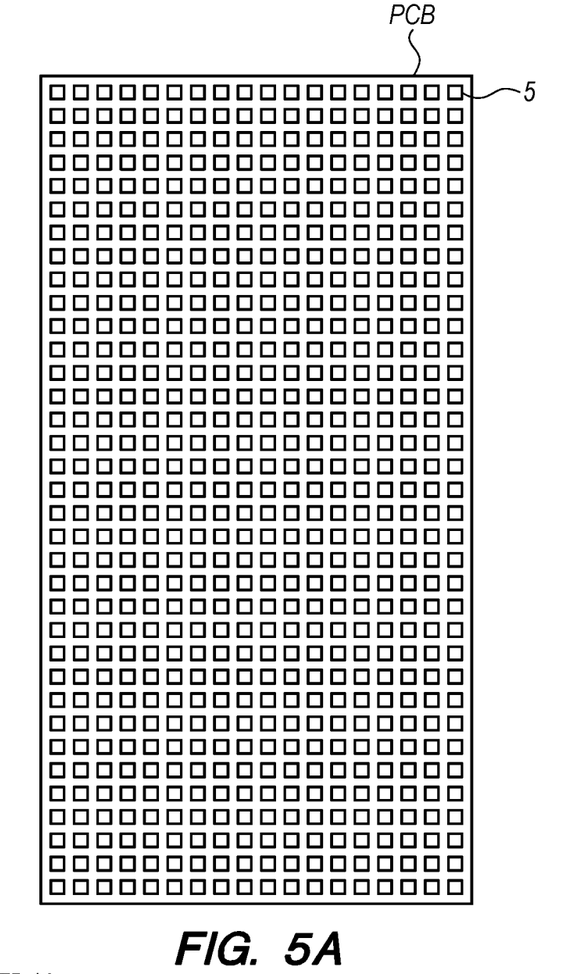
FIG. 5A is a diagram of a matrix of transceiver chips populating a circuit board that may be used in a transceiver module like that of FIG. 2.
Figure 5B:
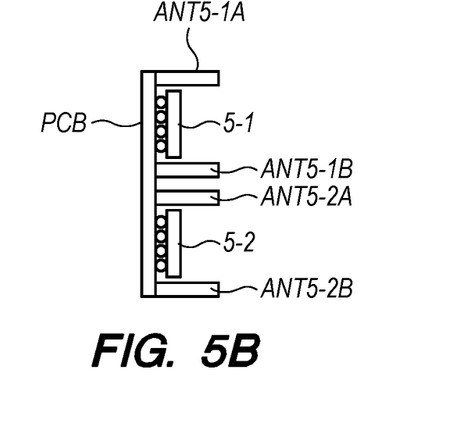
FIG. 5B is a side sectional view of a portion of the transceiver chips of FIG. 5A in accordance with one embodiment.

The number of cells in a module may be hundreds or thousands. Referring to FIG. 5A, a diagram is shown of a circuit board PCB populated with 640 transceiver chips (e.g., transceiver chip 5). Each transceiver chip may be coupled to an antenna like that of FIG. 3A and provided with an isolation structure like that of FIG. 1 or FIG. 4A. Huge aggregate data throughput results. In one embodiment, the antennas are grouped with a spacing roughly equal to the wavelength of the antenna, for example 5 mm. In one embodiment, illustrated in FIG. 5B, transceiver chips and antenna are situated on the same side of a printed circuit board.

Alternative Embodiments

Figure 5C:
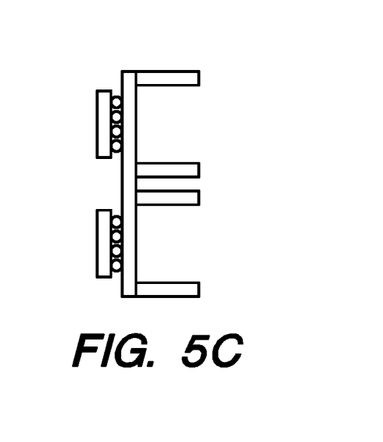
FIG. 5C is a side sectional view of a portion of the transceiver chips of FIG. 5A in accordance with another embodiment.

In some embodiments, it may be advantageous for transceiver integrated circuits and antennas to be place on opposite sides of a printed circuit board. One such embodiment is illustrated in FIG. 5C.

Figure 8A:
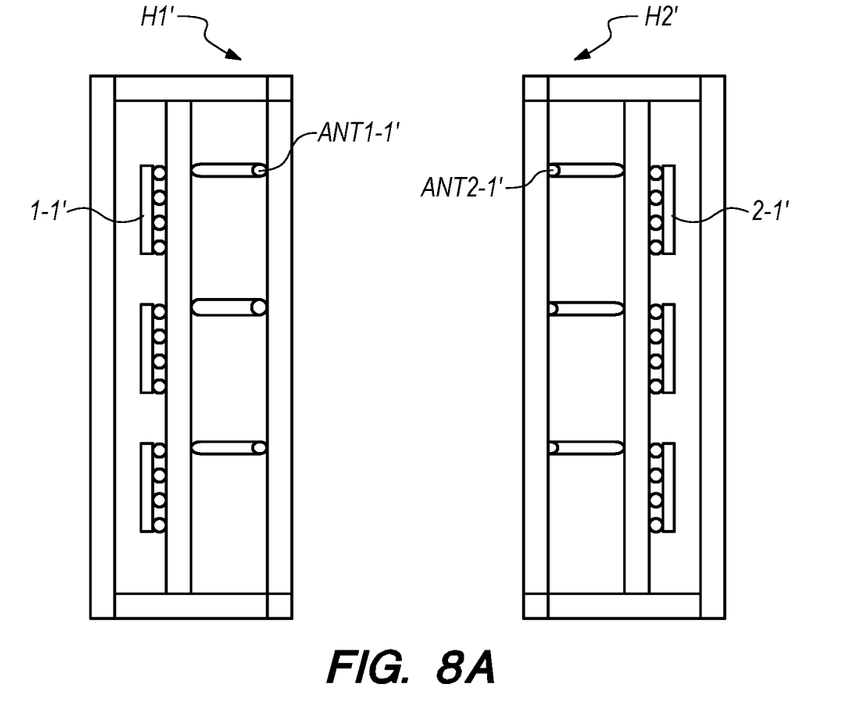
FIG. 8A is a diagram of mating interface modules in accordance with an alternative embodiment.
Figure 8B:
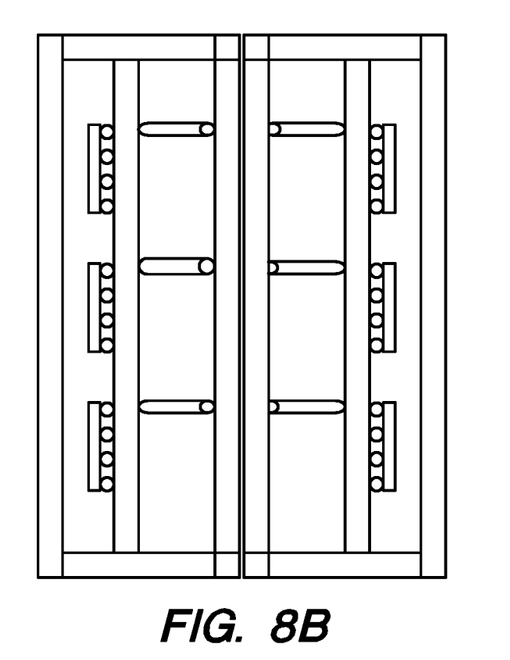
FIG. 8B is a diagram like that of FIG. 8A with the interface modules attached.

Another such embodiment is illustrated in FIG. 8A and FIG. 8B.

Referring to FIG. 8A, a cross-sectional view is shown of two halves (H1', H2') of an interface module. Each half of the interface module may be constructed in a similar manner as described in relation to FIG. 1. When the two halves are joined (FIG. 81), cells are formed in each cell of which opposing antennas (e.g., ANT1-1' and ANT2-1') are provided. In this embodiment, the isolation structures of previous embodiments, while they may be provided, are omitted. Note that in this embodiment, transceiver chips 1-1' and 2-1' are situated on opposite sides of respective circuit board from antennas ANT1-1' and ANT2-1'.

Figure 9:
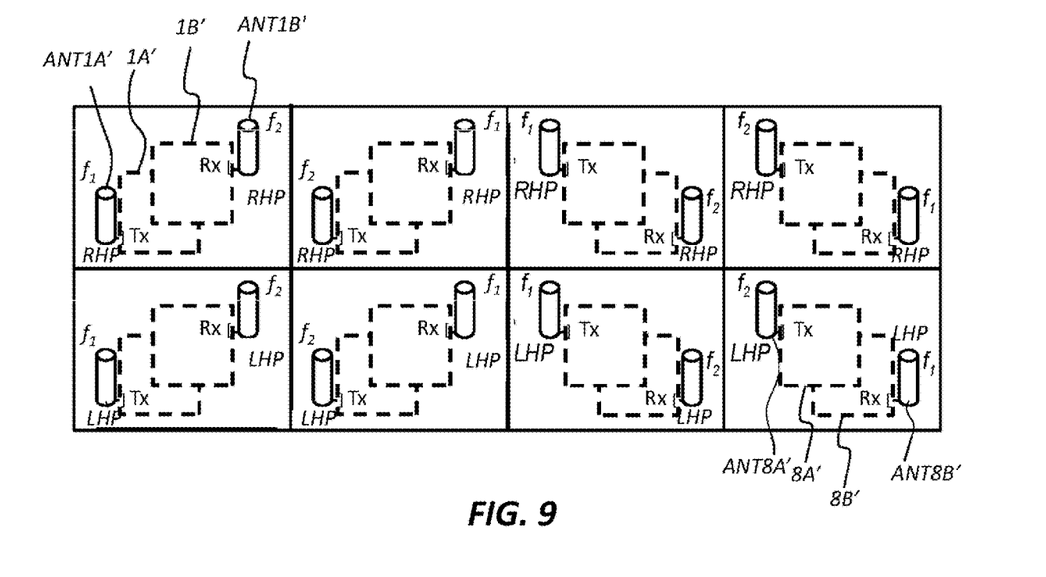
FIG. 9 is a diagram of a transceiver module like that of FIG. 1 in accordance with another embodiment.
Figure 10:
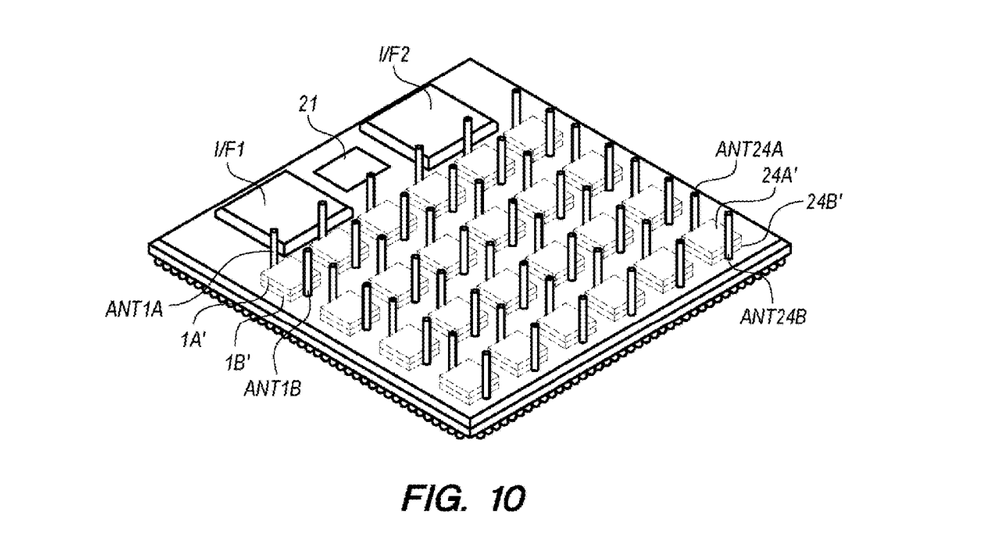
FIG. 10 is a diagram of a transceiver module like that of FIG. 2 in accordance with another embodiment.

Additional such embodiments are shown in FIG. 9 and FIG. 10. FIG. 9 illustrates a transceiver module like that of FIG. 1 but with transceivers situated on the backside of a printed circuit board, on a side opposite from the antennae. Similarly, FIG. 10 illustrates a transceiver module like that of FIG. 2 but with transceivers situated on the backside of a printed circuit board, on a side opposite from the antennae.

In some embodiments, the antennas and transceivers may be integrated together. As frequency increases, antenna size decreases. In one exemplary embodiment, the transceiver chips operate at a frequency in the range of 120 GHz or higher, resulting in a wavelength of about 2 mm or less. One or more antennas, such as monolithic dipole antennas, may then be monolithically integrated together with the transceiver. Such transceiver chips, with integrated antennas, may then be tiled on a printed circuit board. The arrangement of the tiled die may be similar to the arrangement illustrated in FIG. 5.

In some embodiments, some of the antennas may have zero spacing as in the case, for example, of a bifilar antenna. For example, the transmit antenna and receive antenna of a transceiver integrated circuit pair may be realized in the form a bifilar antenna such that the transmit antenna and the receive antenna have zero spacing.

It will be appreciated by those skilled in the art that the present invention may be embodied in other specific forms without departing from the spirit or essential character thereof. The foregoing description is therefore considered in all respects to be illustrative and not restrictive. The scope of the invention is indicated by the appended claims, not the foregoing description, and all changes that come within the meaning and range of equivalents thereof are intended to be embraced therein.

What is claimed is:

1. A communication assembly comprising:
    a plurality of modules each comprising:
        a substrate;
        a group of integrated circuit die arranged on the substrate, each die comprising a transmitter, a receiver or a transceiver; and
        a group of non-planar antennas arranged on the substrate, each antenna being coupled to a respective integrated circuit die;
        wherein the group of non-planar antennas is configured to reduce interaction between signals transmitted by respective ones of the antennas.

2. The communication assembly of claim 1, wherein the group of antennas is configured to enhance communication between a transmitter and an intended target receiver.

3. The communication assembly of claim 1, wherein at least some of the integrated circuit die are stacked.

4. The communication assembly of claim 1, wherein at least some of the antennas are helical antennas.

5. The communication assembly of claim 1, wherein at least one the following:
    antennas or groups of antennas are at least partially physically isolated using isolation structures;
    antennas in closest proximity exhibit different polarization;
    the assembly is multi-channel with multiple frequency-separated channels, wherein antennas in proximity occupy different ones of the channels.

6. A communication assembly comprising:
    at least one module comprising:
        a substrate;
        a group of integrated circuit die arranged on the substrate, each die comprising a transmitter, a receiver or a transceiver; and
        a group of non-planar antennas arranged on the substrate, each antenna being coupled to a respective integrated circuit die;
        wherein the group of non-planar antennas is configured to reduce interaction between signals transmitted by respective ones of the antennas, and wherein each of the integrated circuit die is situated on an opposite side of the substrate than the group of non-planar antennas.

7. The communication assembly of claim 6, wherein at least some of the integrated circuit die are stacked.

8. The communication assembly of claim 6, wherein at least some of the antennas are helical antennas.

9. The communication assembly of claim 6, wherein at least one the following:
    antennas or groups of antennas are at least partially physically isolated using isolation structures;
    antennas in closest proximity exhibit different polarization;

the assembly is multi-channel with multiple frequency-separated channels, wherein antennas in proximity occupy different ones of the channels.

10. A communication assembly comprising:
at least one module comprising:
  a substrate;
  a group of integrated circuit die arranged on the substrate, each die comprising a transmitter, a receiver or a transceiver; and
  a group of non-planar antennas arranged on the substrate, each antenna being coupled to a respective integrated circuit die;
  wherein the group of non-planar antennas is configured to reduce interaction between signals transmitted by respective ones of the antennas, and wherein each of the integrated circuit die is arranged on a side of the substrate opposite a side on which the group of non-planar antennas is arranged on; further wherein the group of antennas is configured to enhance communication between a transmitter and an intended target receiver.

11. The communication assembly of claim 10, wherein at least some of the integrated circuit die are stacked.

12. The communication assembly of claim 10, wherein at least some of the antennas are helical antennas.

13. The communication assembly of claim 10, wherein at least one the following:
  antennas or groups of antennas are at least partially physically isolated using isolation structures;
  antennas in closest proximity exhibit different polarization;
  the assembly is multi-channel with multiple frequency-separated channels, wherein antennas in proximity occupy different ones of the channels.

* * * * *